INVENTOR.
BERT NOBLE
BY
ATTORNEY

Jan. 17, 1961  B. NOBLE  2,968,463
BATCHING DEVICE
Filed Feb. 27, 1959  7 Sheets-Sheet 2
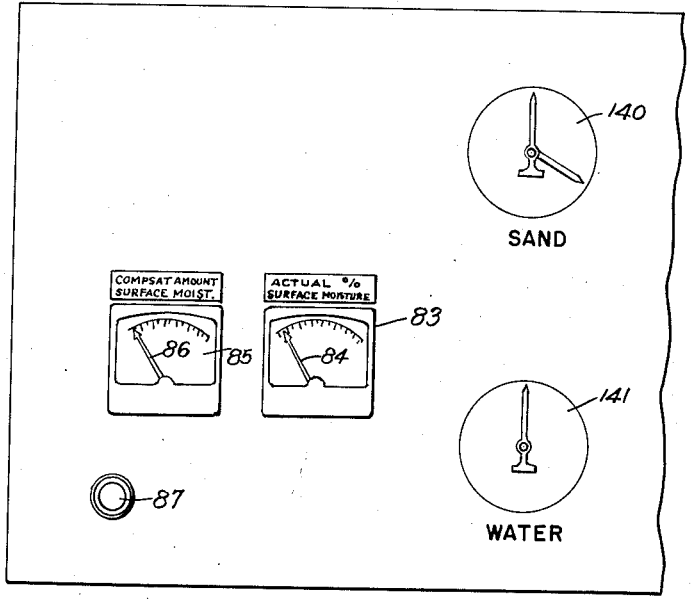
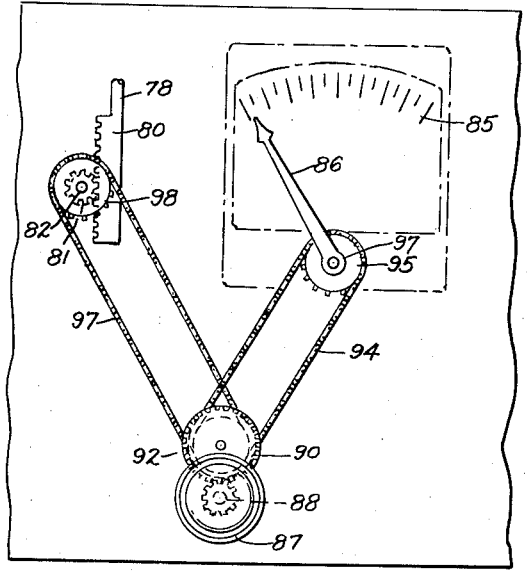
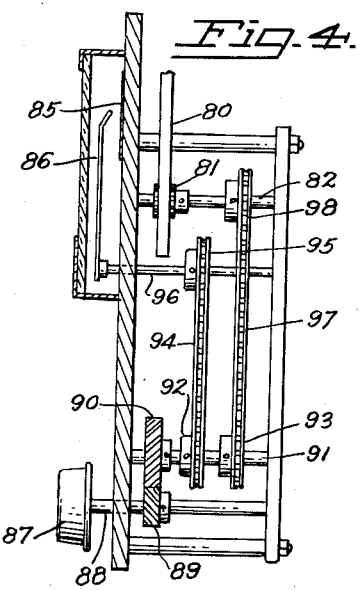
INVENTOR.
BERT NOBLE
BY
ATTORNEY

INVENTOR.
BERT NOBLE
ATTORNEY

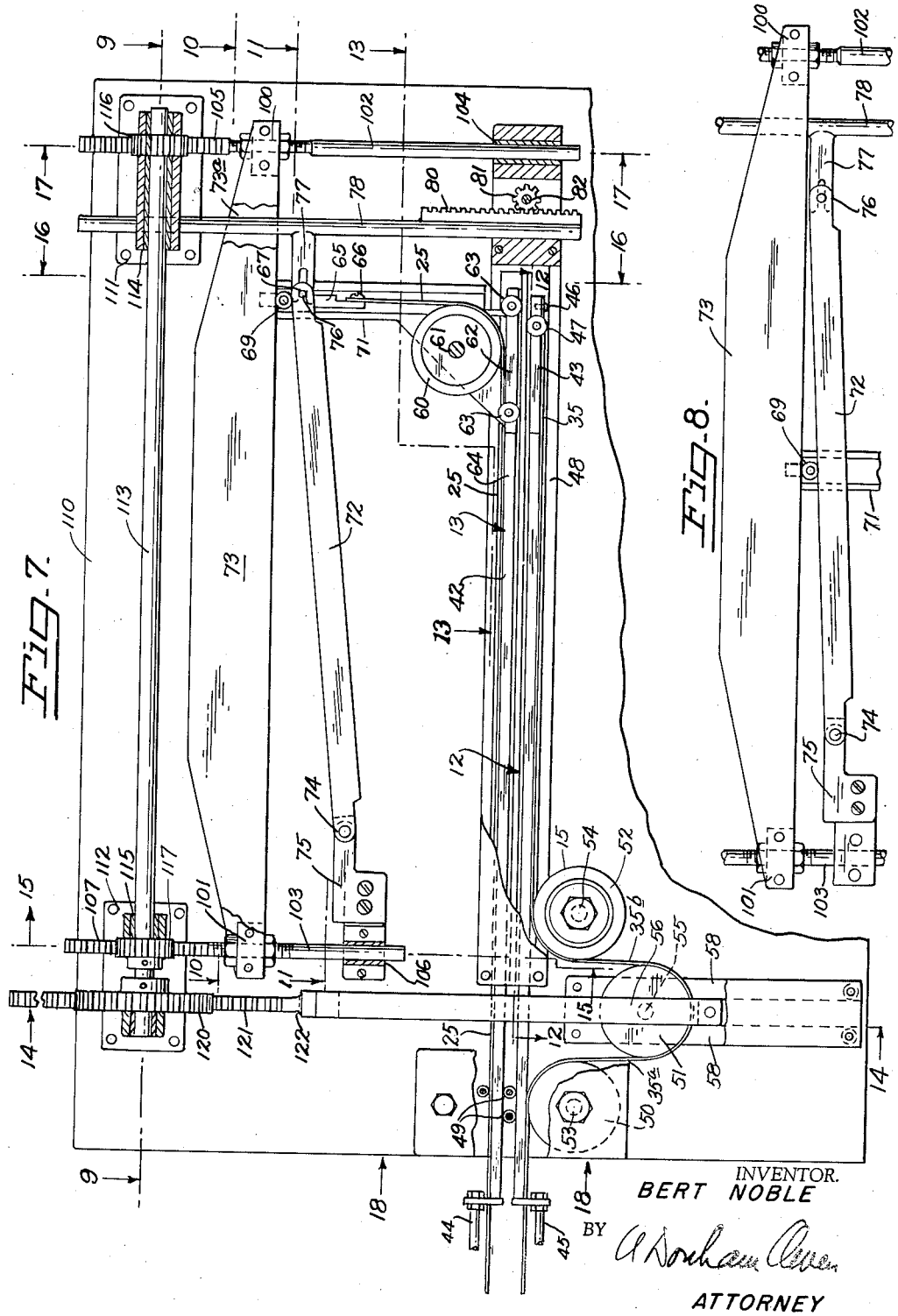

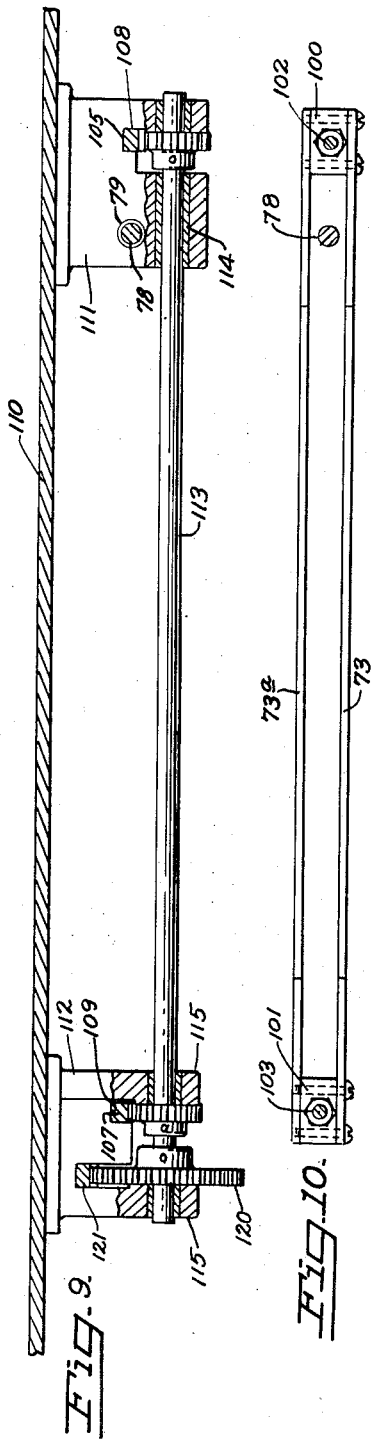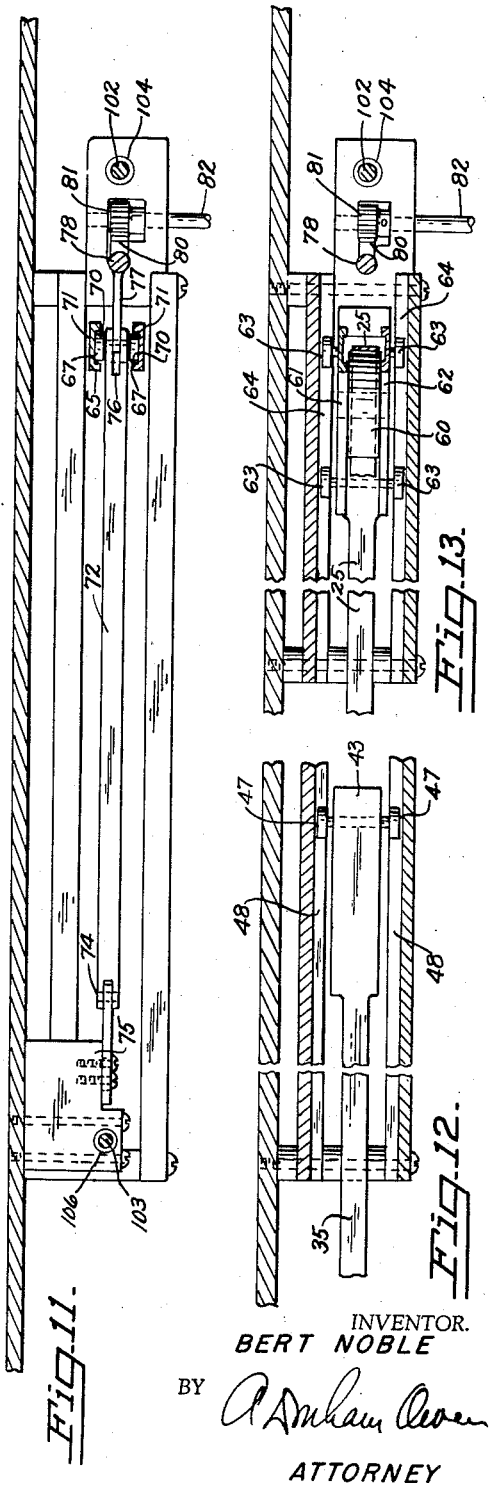

Jan. 17, 1961    B. NOBLE    2,968,463
BATCHING DEVICE
Filed Feb. 27, 1959    7 Sheets-Sheet 6
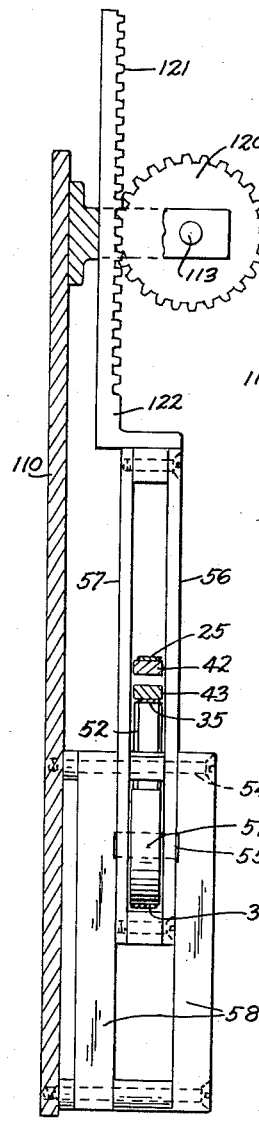
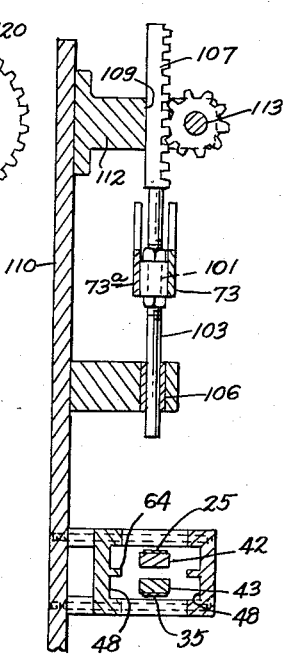
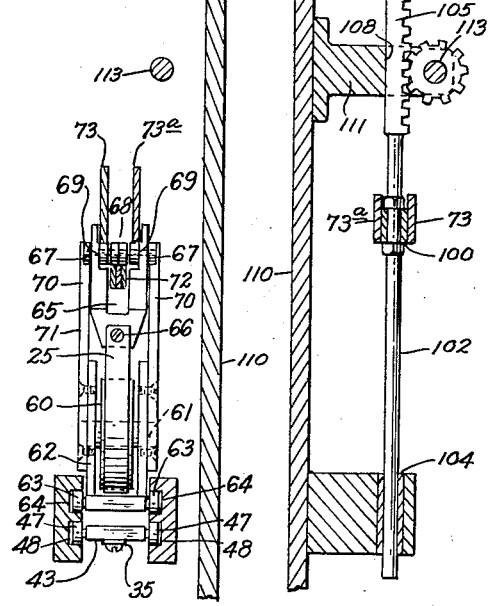
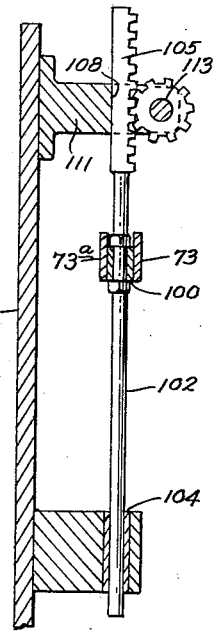
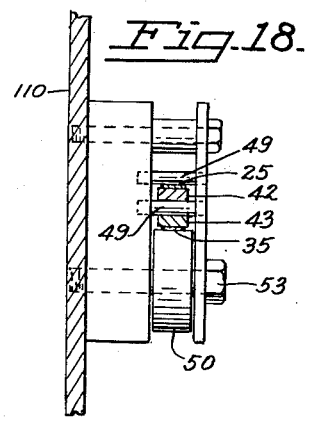
INVENTOR.
BERT NOBLE
BY
ATTORNEY.

Jan. 17, 1961 B. NOBLE 2,968,463
BATCHING DEVICE
Filed Feb. 27, 1959 7 Sheets-Sheet 7
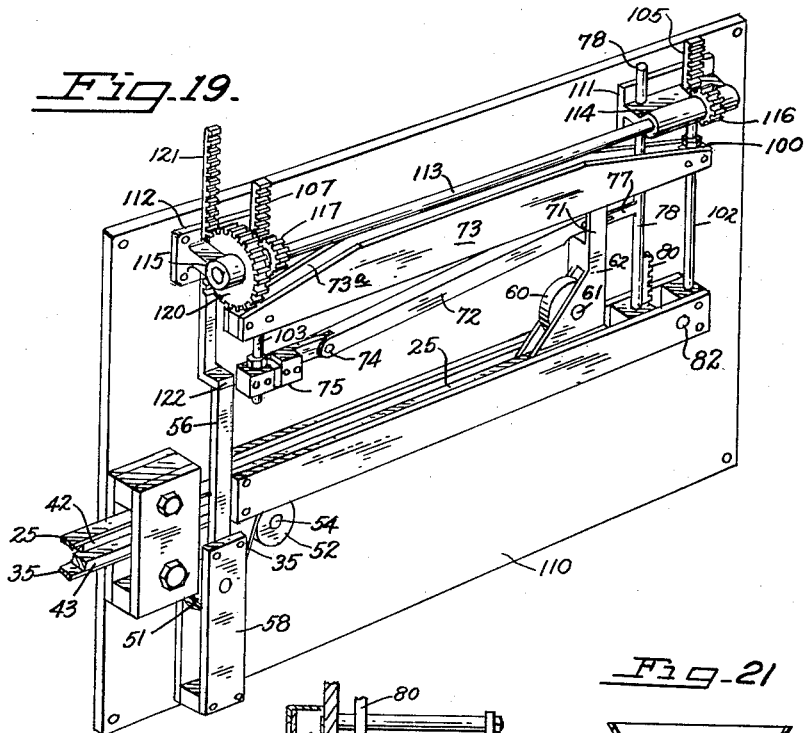
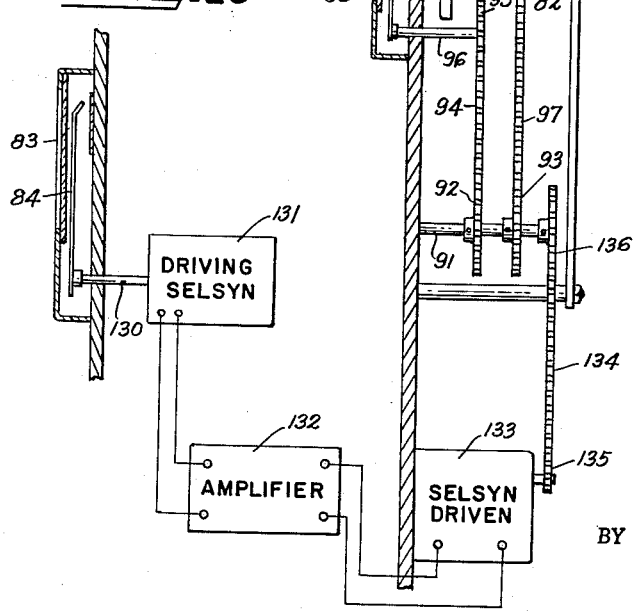
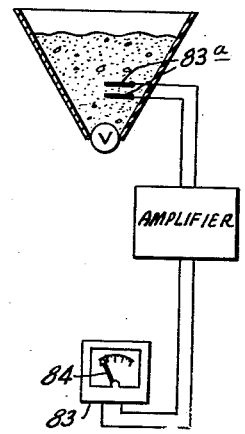
INVENTOR.
BERT NOBLE
BY
ATTORNEY.

United States Patent Office 2,968,463
Patented Jan. 17, 1961

2,968,463

BATCHING DEVICE

Bert Noble, P.O. Box 152, Paso Robles, Calif.

Filed Feb. 27, 1959, Ser. No. 795,968

14 Claims. (Cl. 249—14)

This invention relates to improvements in batching plants in which a plurality of ingredients are weighed out simultaneously in various pre-selected combinations, each of predetermined proportions of the several ingredients. More particularly, the invention incorporates into a batching plant apparatus for compensating for the amount of moisture in an ingredient. Thus, in a concrete batching plant, the weight setting of the sand (or other aggregate) scale is increased to add more sand to compensate for its moisture content, and at the same time the weight setting of the scale measuring the water is decreased by an amount corresponding to the amount of water already present in the sand or other aggregate.

The need for this invention stems from the fact that the total amount of water in a concrete batch greatly affects the strength of the dry concrete. Water is added, as an ingredient, but sand and some other aggregates often contain some water already, held as surface moisture. This surface moisture is just as much water as the water which is added as a separate ingredient, and it has the same effect on the concrete. Unless this moisture is compensated for, the proportioning of the batch is illusory. It is well known that too much water reduces the strength of concrete; so the surface moisture in the sand must be corrected for if the structural strength of the concrete is to be maintained.

For example, suppose that due to a rain the sand contains 10% moisture by weight. Then, unless some correction is made, a batch of 2000 pounds of "sand" would really comprise 1800 pounds of sand and 200 pounds of water. The additional 200 pounds of water greatly affects the water-to-cement ratio, and the sand-to-cement ratio is also thrown into error. The result of using the batcher without correction or compensation could be a concrete that was much weaker than what had originally been planned.

Constant changes of scales is a troublesome job and is often neglected; so the present invention provides a quick, easy way to compensate for moisture present in the sand by adding more sand to the batch and at the same time deducting from the separately-added water an amount corresponding to the amount of water present as surface moisture in the sand in the batch. The invention also gives a reading of this change and shows the changed weights as reflected on the sand and water scales.

Some attempts to compensate have been made previously, but they were not satisfactory because most of them attempted to change the scale mechanism—an impractical and expensive change. Other devices did not change the scale setting percentage-wise in compensation, but in absolute amounts, and the operator had to figure out, each time, the total amount of moisture present and then specially set the weights of the scale to compensate for that amount. The present invention does not require any reconstituttion of the weighing scales and it also eliminates the necessity of separately figuring out the amount of water to be compensated for, since it operates on a percentage basis.

An object of the invention is to provide means for compensating for the percentage of moisture in sand at any poundage of sand.

Another object of the invention is to provide for an automatic differential compensation that adds sand to a batch in the amount by which dry sand has been displaced with water in the moist sand.

Another object is to subtract from the separately weighed water the amount of water present in the sand.

The present invention thus provides a compensator which automatically changes the amount of water and sand weighed for any batch to compensate for the water in the sand. It has the ability to compensate for each different weight of sand, as may be required in any number of different batches.

Another object is to provide a differential device that also compensates for the use of different scales on the sand and water scales; in other words, the scale dial for sand may read from 0–5000 pounds, while the water scale may read from 0–1000 pounds, and the present invention compensates for that difference when adding sand and subtracting water from those two scales.

An important feature of the invention is that it can be made to operate either manually or automatically. It can be set by hand to compensate for the amount of moisture present in the sand according to a separate moisture reading, or it can be made fully automatic and operated by a moisture-indicating mechanism.

Other objects and advantages of the invention will appear from the following description of a preferred embodiment thereof presented in accordance with the statute.

In the drawings:

Fig. 2 is a view in front elevation of a moisture control panel used in the invention.

Fig. 3 is a view in front elevation on an enlarged scale of the moisture control knob and the adjustment mechanism operated thereby, with the indicator that lies in front of these parts shown in phantom.

Fig. 4 is a view in side elevation and partly in section of the adjustment mechanism of Fig. 3.

Fig. 7 is a view similar to Fig. 6, on a still further enlarged scale, showing the device in its actual weight position.

Fig. 8 is a fragmentary view of a portion of the device showing some of the parts as they appear in a different weight setting and at a different percentage of moisture.

Fig. 9 is a view in horizontal cross section taken along the line 9—9 in Fig. 7 and showing the rack and pinion devices for adjusting the sand and water scales relatively to each other.

Fig. 10 is a view in horizontal section taken along the line 10—10 in Fig. 7 and showing the cross bar that operates the racks and pinions of Fig. 9.

Fig. 11 is a view in horizontal section taken along the line 11—11 of Fig. 7 and showing the transverse indexing arm and some associated parts.

Fig. 12 is a fragmentary view in horizontal section taken generally along the line 12—12 in Fig. 7 but showing the tape-carrying roller that is connected with the water scale, although in Fig. 7 the roller is at a different location.

Fig. 13 is a fragmentary view in horizontal section taken along the line 13—13 of Fig. 7 and showing the weight-adjusting trolley for the sand scale, and some associated parts.

Fig. 14 is a view in vertical section taken along the line 14—14 of Fig. 7 and showing the water-scale-adjusting rack-and-pinion arrangement, with some associated parts.

Fig. 15 is a view in vertical elevation and in section, taken along the line 15—15 in Fig. 7 and showing the left-hand rack-and-pinion arrangement that is directly operated by the sand-compensating mechanism, as well as the trolley tracks for the sand and water scales.

Fig. 16 is a view in vertical section taken along the line 16—16 of Fig. 7 and showing the part of the adjusting mechanism with the vertically moving moisture compensating trolley and the horizontal weight-adjusting trolley for the sand scale.

Fig. 17 is a view in vertical section taken along the line 17—17 of Fig. 7 showing the right-hand rack-and-pinion arrangement that is operated like that of Fig. 15.

Fig. 18 is a view in vertical elevation and in section taken along the line 18—18 of Fig. 7.

Fig. 19 is a perspective view looking from the rear at the moisture control device of Fig. 5.

Fig. 20 is a partly diagrammatic view similar to Fig. 4 of a modified form of the device with moisture compensation automatically set by the moisture meter.

Fig. 21 is a generally diagrammatic view showing the connection between the moisture meter and its probe in an aggregate containing hopper.

Figure 1:
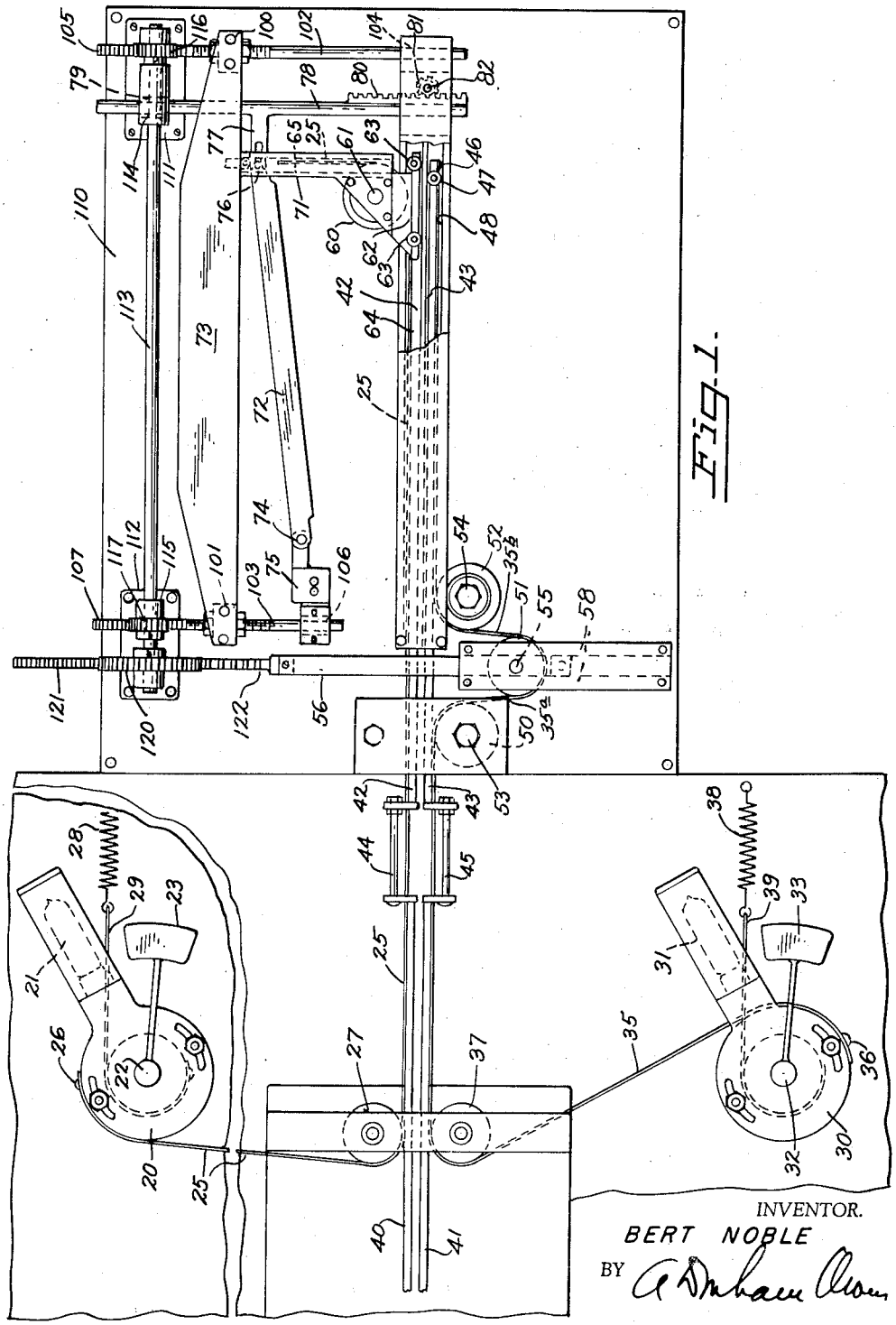
Fig. 1 is a view in rear elevation with some parts broken away and shown in section and others broken to conserve space, of a portion of an automatic batching device. The view includes a portion of the scale indicators of both the sand and water scales and a moisture-compensation device embodying the principles of the invention.

The invention herein is designed to be of particular use in concrete batching plants, such as that shown in my pending patent application Serial No. 647,245, filed March 20, 1957, and will be described in connection with that invention without redescribing that scale, except as is essential to understand the present invention. The man skilled in the art will also see clearly how this invention can be adapted to other kinds of batching plants.

In that invention the scales are each controlled by setting a photoelectric cell and light path in one rotational position and then using the scale dial shaft and a Selsyn motor to rotate a cutoff flag as material is weighed into its hopper until, at the set weight, the flag passes in front of the photoelectric cell. For example, in Fig. 1 the weight setting for sand is obtained by rotating a disc 20 to carry a photoelectric cell 21 to a desired rotational position. Then, when sand pours into the sand-weight hopper (not shown) it turns the scale dial (not shown), and this, through a Selsyn motor (not shown) turns a shaft 22. The shaft 22 carries a weight-cutoff flag 23, and when the desired weight is in the hopper, the flag 23 passes in front of the photoelectric cell 21 and cuts off the passage of light into the cell 21. The result, as explained in Serial No. 647,245 is to stop the flow of sand into the hopper and then to dump the weighed sand into the batch.

The rotational position of the disc 20 and photocell 21 is governed by a tape 25 which is attached to the disc 20 by a fastening member 26. The tape 25 passes down from the disc 20 and over an idler roller 27. By pulling down on the tape 25 the disc 20 is moved counterclockwise in Fig. 1, and this represents an increase in the weight setting. A spring 28 is attached to the disc 20 by a tape 29 and pulls the disc 20 back toward a zero position when the tape 25 slackens.

Similarly, the water scale has a disc 30, photoelectric cell 31, shaft 32, flag 33, and a tape 35 that is secured to the disc 30 by a fastening member 36 and passes up to and beyond an idler roller 37. When the tape 35 is pulled up, the disc 30 rotates counterclockwise, representing an increase in the weight setting. A spring 38 is connected to the disc 30 by a tape 39 and restores the disc 30 toward its zero position as the tape 35 slackens.

In the preceding invention, Serial No. 647,245, the tapes 25 and 35 were shown as rigidly connected to respective rods 40 and 41 and moved with them, so that when the rods were hydraulically moved to the right, the amount of weight set for any particular batch was raised and when the rods were moved to the left, the weight was reduced. There was a zero position and a full-weight position for each batch and for each scale on each batch. In the present invention this general structure is modified to provide moisture compensation. In the first place, the rods 40 and 41 have been connected to extension rods 42 and 43 respectively, by connecting members 44 and 45, these members being separately adjustable for shortening and lengthening the tapes 25 and 35 for accurate calibration of the scales. In the second place, only the tape 35 is rigidly connected to its rod 43 at its outer end by a connection 46. The rod 43 rides on a pair of rollers 47 in a track 48, and its left-hand end preferably rides on stationary rollers 49 that also engage the rod 42 (see Fig. 7). Moreover, even the tape 35 does not simply parallel the rods 41 and 43 but in its path, between the idler roller 37 and the connection 46, it passes over a set of three idler rollers 50, 51, and 52. Of these, the upper idler rollers 50 and 52 are mounted for free rotation on stationary shafts 53 and 54 and are there only to guide the tape 35, but the shaft 55 for the idler rod 51 is movable vertically, as shown in Figs. 1 and 7, being mounted across a pair of rods 56 and 57, which are mounted in a slotted guide member 58. See Fig. 14. It will be apparent that when the shaft 55 moves the roller 51 down and lengthens the vertical passes 35a and 35b, pull is exerted on the tape 35 in addition to the pull caused by horizontal movement of the tape end 46; so the weight setting of the water scale can be changed both by horizontal movement of the tape end 46 and by changing the vertical position of the roller 51, and that these settings are quite independent of each other. How and why this is done will be explained shortly, after a description of how the sand-setting tape 25 is adjusted.

In the third place, the tape 25 for the sand scale extends parallel to and along the rods 40 and 42, but instead of being secured to the end of the extension rod 42, the tape 25 passes around an idler roller 60 that is mounted rotatably on shaft 61 carried by a horizontally moving trolley 62 on the end of the rod 42, whose wheels 63 move in a trackway 64. The tape 25 then extends up in a vertical direction, and is secured by a connection 66 to a vertically movable trolley 65 of which considerable further description will be given.

The trolley 65 has three pairs of wheels 67, 68, and 69. (See Fig. 16.) The outer wheels 67 move vertically in a pair of tracks 70 in a vertical frame 71. The inner wheels 68 move generally horizontally along the upper surface of a transverse indexing arm 72 and the wheels 69 move along the lower surfaces of a pair of cross bars 73, 73a. It is the vertical movement of the trolley 65 which causes the moisture compensation of the sand scale. This, in turn, is determined by the inclination of the transverse indexing arm 72, which is pivotally mounted at one end by a pintle 74 to a stationary frame member 75. The opposite end of the cross bar 73 is pivotally mounted by a pintle 76 to an extension arm 77 of a vertically movable shaft 78.

Figure 5:
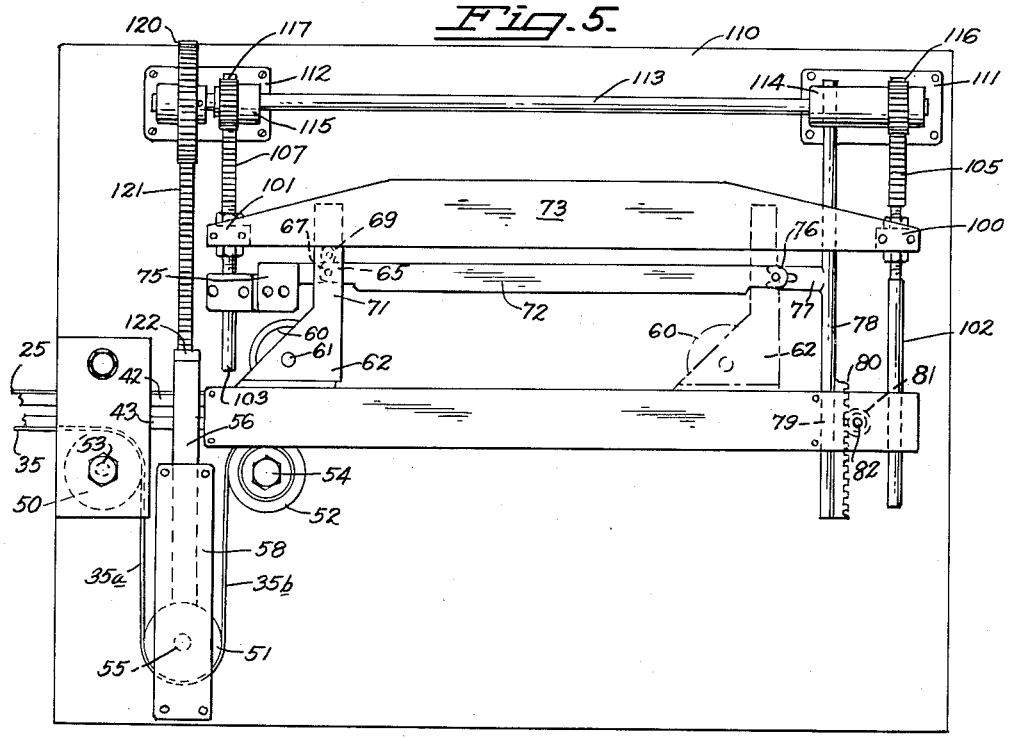
Fig. 5 is a view in rear elevation on an enlarged scale of the moisture compensation device of Fig. 1, with the device set for zero moisture in the sand. The zero weight position of the parts is shown in solid lines and the full weight position of those parts that move between zero weight and full weight is shown by some of the broken lines, other broken lines indicating parts behind parts.
Figure 6:
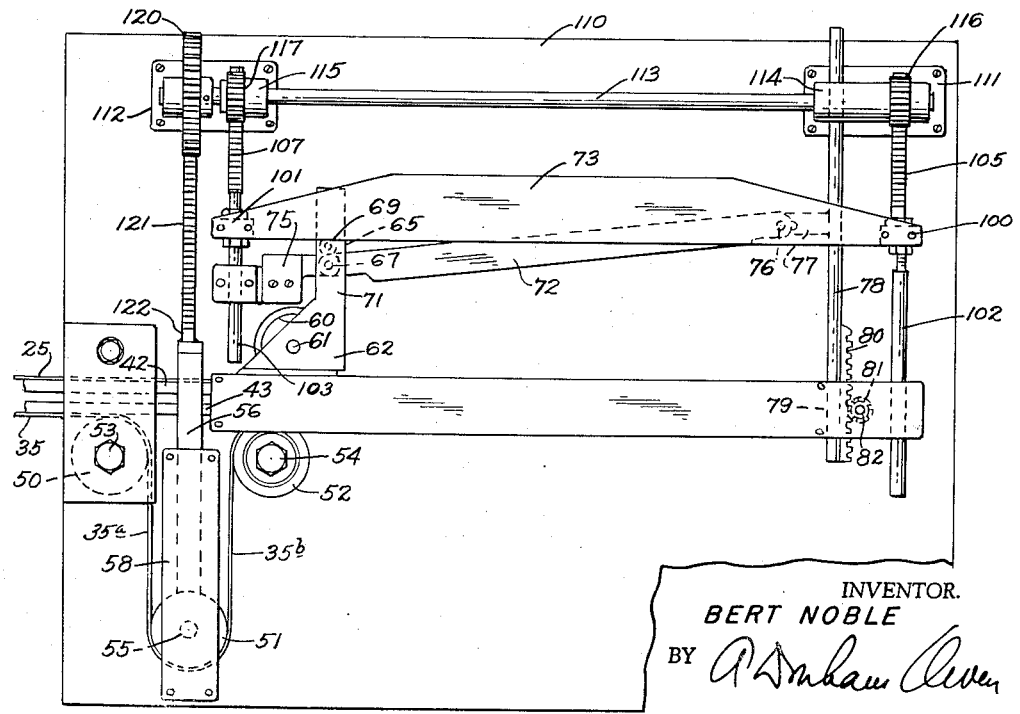
Fig. 6 is a view similar to Fig. 5 showing the device set to compensate for sand having 10% moisture and with the device in its zero weight position.

When, and only when, there is to be no moisture compensation whatever, that is, when the sand is 100% free of surface moisture, the transverse indexing arm 72 is level (see Fig. 5). At that time, then, horizontal movement of the rods 40 and 42 extends the tape 25 and rotates the disc 20, but the trolley 65 moves only horizontally; so there is no extension of the tape 25, except by virtue of the horizontal movement. Nor is there any extension of the tape 35 than by the movement of the arms 41 and 43. In all other positions of the transverse indexing arm 72, the arm 72 is inclined (see Figs. 6–8), and its angle of inclination corresponds to the percent of moisture in the sand. When this is the case, horizontal movement of the rods 40 and 42 not only lengthens the tape 25 by virtue of its horizontal movement, but also results in vertical movement of the trolley 65, which pulls the tape 25 up vertically in addition to its horizontal movement. Since the vertical movement is proportional to the horizontal movement, and is also proportional to the percent of moisture in the sand by virtue of setting, as will be explained later, this simultaneous horizontal and vertical movement effects compensation for the moisture in the sand. All this will now be explained more fully.

The angle at which the transverse indexing arm 72 is set depends upon the vertical position of the vertically movable shaft 78. This shaft moves in bearings 79 and at its lower end has a rack 80 which engages a pinion 81 mounted on a shaft 82. This shaft 82 may be made to rotate either manually or mechanically to raise and lower the end 76 of the arm 72 and thereby set it for some percent of moisture. How this is done is shown best in Figs. 2, 3, and 4. Assume first that the shaft 82 is to be controlled manually. A moisture meter 83, a well-known article of commerce, has some electrical probes 83a (Fig. 21) placed in the sand and connected electrically to a needle indicator 84 of the meter 83, which is calibrated to read in the percent of surface moisture. There is also an instrument 85 identical in appearance to the meter 83, with a needle 86. However, this instrument 85 is not a meter but is a manually settable indicator. Below it, a knob 87 is attached rigidly to a shaft 88, and the shaft 88 carries a helical gear 89. The gear 89 engages a helical gear 90 which is mounted on a shaft 91, and the shaft 91 also carries two coaxial sprocket wheels 92 and 93. A chain 94 extends from the sprocket wheel 92 up to a sprocket wheel 95 which is mounted on the same shaft 96 as the needle 86 and therefore controls the position of the needle 86. A chain 97 mounted on the sprocket wheel 93 turns a sprocket wheel 98 which is on the shaft 82.

Thus, turning the dial 87 controls the pinion 81, and therefore the rack 80 and will act to raise and lower the shaft 78 and thereby to raise and lower the pintle 76 of the arm 72 and therefore adjust its angle. The arm 72 by itself is sufficient to provide the needed sand compensation by increasing the weight of sand proportional to the amount of moisture present.

However, the device as so far described would not compensate on the water scale for the water present in the sand. The present invention does do this in a single operation, so that it is not necessary to have another dial to compensate for the moisture.

In accord with the present invention, the cross bars 73, 73a are mounted on brackets 100 and 101 that are mounted rigidly on a pair of vertical shafts 102 and 103. The shaft 102 has bearings 104 and terminates in a rack 105. The shaft 103 has bearings 106 and terminates in a rack 107. The racks 105 and 107 slide in slots 108 and 109 of a frame 110, with brackets 111 and 112. A shaft 113 is arranged horizontally in journals 114 and 115 of the brackets 111 and 112 and is provided with a pinion 116 in engagement with the rack 105 and a second pinion 117 of identical size and toothing in engagement with the rack 107. Thus, when the trolley 65 moves from left to right in Figs. 1 and 7, it rides over the inclined arm 72 and raises the cross bars 73, 73a and thereby effects rotation of the shaft 113.

The shaft 113 is also provided with a larger pinion 120 which engages a rack 121 on the end of a vertical rod 122 which in turn is connected with and supports the bars 56 and 57 that support the idler roller 51. As a result, upward movement of the cross bars 73, 73a, which is directly proportional and equal to the upward movement of the trolley 65, results in an increased movement vertically of the idler roller 51.

The reason for this increase is as follows: there is usually much more sand in a batch than there is water. Therefore, scale dials corresponding to, say, 5000 pounds of indication are provided for the sand scale, while the dials of the water scale show only 1000 pounds of indication but over the same arc as the 5000 pounds on the sand scale. Hence, there must be five times as much movement on the water scale as on the sand scale in order to compensate for the water present in the sand. For example, suppose that there were 4000 pounds of sand containing 10% moisture, which would mean 400 pounds of water actually in the sand. When that particular moisture had been compensated for, and in order to get the equivalent of 4000 pounds of dry sand, there would be 4,444⅘ pounds of wet sand in the scale, comprising as actual constituents 4000 pounds of sand and 444⅘ pounds of water. Suppose at the same time that the amount of water to be added were 800 pounds. Obviously, the scale dial must turn the same amount for 1000 as the sand scale turns for 5000. Then, if 444⅘ pounds are to be compensated for on the water scale, its setting will be 355⅗ pounds, and there must be considerably more rotation of the water scale indicator there than on the sand scale. The idler wheel 51, by its movement, affects two vertical segments of the tape 35; so for each inch it moves, the tape 35 moves two inches, since there are two vertical passes controlled by it. Further adjustment is made by the gear ratio, i.e., the ratio between the pinion 120 and the pinions 116 and 117. When the racks 105, 107, and 121 and the pinions 116, 117, and 120 all have identical pitch and identical toothing, then by merely increasing the diameter of the pinion 120, the ratio is affected. For example, by making its diameter two and a half times that of the pinions 116 and 117, the pinion 120 then produces (through the roller 51) five times as much movement on the water scale tape 35 as is produced on the sand scale tape 25.

In considering the operation of the device, it will be apparent that the compensation is percentage-wise and therefore that the compensation can be read directly from a percentage-type moisture meter, which simplifies that operation, and also that the compensation applies to whatever weight the particular batch is being made, once the initial adjustment of the dial knob 87 is made. Thus, assuming that the sand maintains its moisture content over, say, a day, no further adjustments need be made and during the remainder of the day the operation is entirely automatic or, if it does change, the operator can learn that fact from the indicator 84 and can change his compensation simply by conforming the indicator 86 to the indicator 84. Thus, reviewing the operation, in order to compensate for moisture, the operator watches the moisture meter 83 and reads the position of its needle. He then adjusts the needle 86 by turning the knob 87 to adjust its position. This needle 86 has been calibrated so that the rack 80 is raised by the pinion 81 an amount that changes the inclination of the transverse indexing arm 72 by an amount corresponding to the percent moisture in the sand. Once this has been done, all the rest is automatic.

For, when the scale is operating and any particular batch setting is made and weighing begins, the rods 42 and 43 are moved to the right and thereby extend the tapes 25 and 35. The tape 25 is secured to the trolley 65 and therefore as the trolley 65 rides up the inclined arm 72, the tape 25 is lengthened not only by its horizontal travel but by a vertical amount corresponding at each horizontal position to the percentage of moisture in the sand. Simultaneously, this raises the cross arms 73 and 73a an identical amount, thereby raising the racks 105 and 107 and rotating the shaft 113 through its pinions 116 and 117. Rotation of the shaft 113 rotates the larger pinion 120, raising the rack 121 and thereby raising the idler wheel 51 and so shortening the tape 35 by a multiple of the distance by which the tape 25 was lengthened. This exerts a reduction in the amount of water to be weighed out by relaxing the pull of the water tape 35 on the disc 30, giving an amount corresponding to the actual amount of water present in the sand after the compensation by adding additional moist sand.

Fully automatic operation can be achieved by incorporating the structure shown in Fig. 20. In this modification, the moisture meter needle 84 has its shaft 130 connected to a Selsyn motor 131. The Selsyn drive motor 131 is connected through an amplifier 132 to a drive or slave Selsyn motor 133 which operates through a gear train chain 134 and sprockets 135, 136 or other suitable means, to turn the shaft 91. Thereafter the operation is as in Figs. 2–4. So a change in moisture affects the gauge needle 84 and thereafter the pinion 81 is automatically driven to compensate for the moisture.

It may be mentioned that the weights are reflected on a suitable sand scale dial 140 and water scale dial 141 in a well-known manner.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A moisture-compensating device for a scale for a moist aggregate, to add weight thereto corresponding to the moisture content, said scale having weight-setting means operated by pull on a tape, including in combination: horizontally movable means having means for guiding said tape from a horizontal to a vertical position; means for moving said horizontally movable means a distance corresponding to an uncompensated weight setting; vertically movable means connected to the end of said tape and supported for horizontal movement with said horizontally movable means while movable vertically relatively to said horizontally movable means; a generally horizontally extending arm along which said vertically movable means moves; and means to incline said arm to an angle corresponding to an observed moisture content of the material being weighed, so as to move said vertically movable means vertically an amount proportional both to said moisture content and to the horizontal travel of said horizontally movable means.

2. The device of claim 1 including a mechanism for subtracting from the weight setting of a water-weighing scale also having weight-setting means operated by pulling a tape to raise the weight setting, said subtracting being done to avoid duplication of the moisture present in said moist aggregate being weighed, said mechanism comprising second horizontally movable means for said water scale having the tape for said water scale attached thereto; second vertically movable means supporting a vertical pass of said tape without affecting its horizontal movement; and means actuated by said first vertically movable means for shortening said vertical pass by moving said second vertically movable means toward said second horizontally movable means an amount proportional to the vertical movement of said first vertically movable means.

3. The device of claim 1 having a moisture compensation percent indicator and wherein the means to incline said arm also controls a setting of said moisture compensation percent indicator, to indicate the amount of compensation.

4. The device of claim 3 having a moisture meter with actuating means directly in contact with and actuated by said aggregate, and a moisture content indicator and wherein said moisture compensation percent indicator is made proportional to and is arranged beside said moisture content indicator.

5. The device of claim 4 including means actuated by said meter for automatically setting the inclination of said arm.

6. A moisture-compensating device for a moist-aggregate-weighing scale having a weight-setting mechanism operated by pulling on a tape secured to said mechanism, including in combination: a horizontally movable trolley having an idler wheel rotatable on a horizontal axis for guiding said tape from a horizontal to a vertical position and a vertical track; means for moving said horizontal trolley a distance corresponding to an uncompensated weight setting; a vertically movable trolley connected to the end of said tape and having a first set of wheels movable along said track and a second set of wheels; a generally horizontally extending arm on which said second set of wheels moves; and means to incline said arm to an angle corresponding to an observed moisture content of the material being weighed, so as to move said vertically movable trolley vertically an amount proportional both to said moisture content and to the horizontal travel of said horizontally movable trolley.

7. The device of claim 6 having means, actuated by the moisture content of the aggregate to be weighed, for operating said means to incline the arm.

8. The device of claim 6 wherein there is a moisture meter actuated by the moisture content of the aggregate to be weighed, said meter having a moisture percent indicator, and a dummy indicator beside and similar to said moisture percent indicator and movable manually by said means to incline said arm, to enable manual adjustment of the moisture compensation to the value of the moisture percent indicated.

9. The device of claim 6 wherein a water scale of the tape-actuated type like the aggregate scale is also to be compensated by reducing its weight setting by an amount proportional to the moisture content of the aggregate weighed, comprising vertically movable bar means; a third set of wheels on said vertically movable trolley rolling on said bar means and determining its vertical position according to the inclination of said arm and the horizontally movable trolley; a vertical pass on the water-scale tape; a horizontally movable rail to which the end of said water-scale tape is secured, said water-scale tape thereby being extended and shortened by said rail independently of the length of said vertical pass and vice versa; and means actuated by said vertically movable bar means for shortening said vertical pass an amount proportional to the vertical movement of said vertically movable trolley.

10. The device of claim 9 wherein the last-mentioned means comprises a pair of vertical racks rigidly connected to said vertically movable bar means and movable vertically therewith, a shaft having a pinion engaging each said rack and a third pinion, and a third rack engaging said third pinion and actuable to change the length of said vertical pass.

11. The device of claim 10 wherein said vertical pass includes three idler guide rollers for said water-scale tape, two being mounted in fixed relation to said rail and the third one being mounted on a vertically movable support, said support being rigidly connected to said third rack.

12. A moisture-compensating device for an aggregate-weighing scale having a weight-setting mechanism that is operated by pull on a tape, including in combination: a main frame; a horizontally movable trolley movable relative to said frame and carrying an idler wheel rotatable on a horizontal axis for guiding said tape from a horizontal to a vertical position and a vertical track; means for moving said horizontal trolley relative to said frame a distance corresponding to an uncompensated weight setting; a vertically movable trolley connected to the end of said tape and having a first set of wheels movable along said track and a second set of wheels; a generally horizontally extending arm on which said second set of wheels moves, said arm having one end pivoted to said frame and a second end; a vertically adjustable member pivoted to said second end and movable to incline said arm, said member having a rack thereon; a pinion engaging said rack and rotatable to set said arm to an angle corresponding to an observed moisture content of the material being weighed, whereby as said horizontally movable trolley moves horizontally said vertically movable trolley moves vertically an amount proportional both to said moisture content and to the horizontal travel of said horizontally movable trolley.

13. The device of claim 12 wherein rotation of said pinion simultaneously moves a calibrated indicator to show the percent moisture being compensated.

14. A moisture-compensating device for a scale system including a moist-aggregate-weighing scale and a water-weighing scale, each scale having a weight-setting mechanism that is operated by pull on a tape, including in combination: a main frame; a first trolley horizontally movable relative to said main frame and carrying an idler wheel that is rotatable on a horizontal axis and guiding the aggregate-scale tape from horizontal to vertical alignment and also carrying a vertical track; means supported by said frame for moving said first trolley a distance corresponding to an uncompensated aggregate weight setting; a second trolley connected to the end of said aggregate-scale tape and having a first set of wheels movable vertically along said track, a second set of wheels, and a third set of wheels; a generally horizontally extending arm on which said second set of wheels moves, pivoted to said frame; means to incline said arm to an angle corresponding to an observed moisture content of the material being weighed, so as to move said second trolley vertically an amount proportional to said moisture content and to the horizontal travel of said first trolley; a bar connected to the water-scale tape and movable horizontally with repsect to said frame; a set of three idler rollers for guiding said water-scale tape, one said roller being mounted on a vertically movable support and positioned on a lower level than the other two rollers, thereby providing a pair of vertical passes; cross bar means riding on said third wheels and vertically movable thereby; first rack means secured to said cross bar means; a shaft rotatably supported by said frame and having first pinion means engaging said first rack means and having second pinion means; and second rack means engaging said second pinion means and connected rigidly to said vertically movable support.

References Cited in the file of this patent

UNITED STATES PATENTS

| | | |
|---|---|---|
| 2,527,147 | Noble | Oct. 24, 1950 |
| 2,549,704 | Noble | Apr. 17, 1951 |
| 2,559,307 | Martinson | July 3, 1951 |
| 2,559,308 | Martinson | July 3, 1951 |
| 2,607,555 | Noble | Aug. 19, 1952 |
| 2,607,579 | Noble | Aug. 19, 1952 |
| 2,768,823 | Lindars | Oct. 30, 1956 |